(12) United States Patent
Shibata et al.

(10) Patent No.: US 10,118,536 B2
(45) Date of Patent: Nov. 6, 2018

(54) ROAD SURFACE DRAWING LAMP UNIT

(71) Applicant: KOITO MANUFACTURING CO., LTD., Tokyo (JP)

(72) Inventors: Yuichi Shibata, Shizuoka (JP); Noriko Sato, Shizuoka (JP); Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 315 days.

(21) Appl. No.: 14/959,643

(22) Filed: Dec. 4, 2015

(65) Prior Publication Data
US 2016/0161076 A1 Jun. 9, 2016

(30) Foreign Application Priority Data

Dec. 4, 2014 (JP) ................................ 2014-246040

(51) Int. Cl.
| | |
|---|---|
| *B60Q 1/14* | (2006.01) |
| *F21S 41/657* | (2018.01) |
| *F21S 41/26* | (2018.01) |
| *F21S 41/32* | (2018.01) |
| *F21S 41/125* | (2018.01) |

(Continued)

(52) U.S. Cl.
CPC ............. *B60Q 1/143* (2013.01); *B60Q 1/525* (2013.01); *F21S 41/125* (2018.01); *F21S 41/143* (2018.01); *F21S 41/147* (2018.01); *F21S 41/26* (2018.01); *F21S 41/321* (2018.01);

(Continued)

(58) Field of Classification Search
CPC .... B60Q 1/143; B60Q 1/525; B60Q 2300/45; B60Q 2400/50; F21S 41/26; F21S 41/125; F21S 41/143; F21S 41/321; F21S 41/657; F21S 48/1131; F21S 48/1154;

(Continued)

(56) References Cited

U.S. PATENT DOCUMENTS

| | | |
|---|---|---|
| 2009/0046474 A1 | 2/2009 | Sato et al. |
| 2011/0267832 A1 | 11/2011 | Sekiguchi |

(Continued)

FOREIGN PATENT DOCUMENTS

| | | |
|---|---|---|
| CN | 102844616 A | 12/2012 |
| CN | 103075693 A | 5/2013 |

(Continued)

OTHER PUBLICATIONS

Search Report issued in corresponding French Application No. 1561871, dated Feb. 21, 2018 (8 pages).

(Continued)

*Primary Examiner* — Stephen F Husar
(74) *Attorney, Agent, or Firm* — Osha Liang LLP

(57) ABSTRACT

A road surface drawing lamp unit includes a light source module and an optical system. In the light source module, a plurality of light sources which correspond individually to drawing patterns, each of which is long in a first direction which is a width direction of a road and short in a second direction which intersects the width direction of the road and an emitting axis of the light sources, are arranged so that the drawing patterns are drawn at a plurality of locations on the road along the second direction, and the light sources are formed so as to be turned on and off independently. The optical system emits light emitted from the light sources to the front.

5 Claims, 9 Drawing Sheets

(51) Int. Cl.
*F21S 41/143* (2018.01)
*B60Q 1/52* (2006.01)
*F21S 41/147* (2018.01)
*F21S 41/663* (2018.01)

(52) U.S. Cl.
CPC ............ *F21S 41/657* (2018.01); *F21S 41/663* (2018.01); *B60Q 2300/45* (2013.01); *B60Q 2400/50* (2013.01)

(58) Field of Classification Search
CPC .............. F21S 48/1159; F21S 48/1266; F21S 48/1323; F21S 48/1742; F21S 41/147; F21S 41/663
See application file for complete search history.

(56) References Cited

U.S. PATENT DOCUMENTS

2012/0051079 A1    3/2012  Saito et al.
2014/0313755 A1*  10/2014  Tanaka ................ F21S 48/1305
                                                 362/514

FOREIGN PATENT DOCUMENTS

| CN | 104110628 A | 10/2014 |
| EP | 1418381 A2 | 5/2004 |
| EP | 2784375 A2 | 10/2014 |
| JP | 2008-007079 A | 1/2008 |
| JP | 2008-045870 A | 2/2008 |
| JP | 2010-095048 A | 4/2010 |
| JP | 2014-089990 A | 5/2014 |
| JP | 2014-216049 A | 11/2014 |
| WO | 2014/121315 A1 | 8/2014 |

OTHER PUBLICATIONS

Office Action issued in corresponding Chinese Application No. 201510886191.0, dated Jan. 29, 2018 (13 pages).

Notification of Reasons for Refusal issued in Japanese Application No. 2014-246040, dated Aug. 6, 2018 (11 pages).

* cited by examiner

ROAD SURFACE DRAWING LAMP UNIT

CROSS-REFERENCE TO RELATED APPLICATION

The present application claims the benefit of priority of Japanese Patent Application No. 2014-246040, filed on Dec. 4, 2014, which is incorporated herein by reference.

TECHNICAL FIELD

The present invention relates to a road surface drawing lamp unit configured to display on a road surface a piece of information telling that a vehicle is approaching in such a way as to be recognized easily by a pedestrian who is at a blind spot on a road and is hence out of side of a driver of the vehicle.

BACKGROUND ART

JP-A-2008-45870 discloses a drawing system that displays a warning mark 53 reproducing a road sign of no entry or a warning mark 55 of an arrow with a stop line connected to a distal end of the arrow on a road surface lying ahead of a vehicle and situated at an entrance of a road where the vehicle is prohibited from entering and driving from the vehicle as described or illustrated in [0053] or FIG. 5 of a specification of JP-A-2008-45870 so as to warn the driver not to enter the road. It is desirable that the warning display that is displayed from the vehicle is recognized properly not only by the driver but also by a pedestrian as information telling that the vehicle is approaching in restricting the pedestrian from carelessly entering the road where the vehicle is approaching.

The round warning mark 53 illustrated in FIG. 4 of JP-A-2008-45870 is drawn by the drawing system in such a way as to be elongated longitudinally in the traveling direction of the vehicle so as to be seen "round" by the driver who looks down obliquely at the warning mark on the road surface. However, since the mark seen round by the driver is only seen by the pedestrian who is on the road that intersects the road along which the vehicle is approaching as a meaningless mark that is distorted longitudinally in the traveling direction of the vehicle, there is caused a problem that it is difficult for the pedestrian to recognize the fact that the vehicle is approaching. Additionally, the mark 53 of JP-A-2008-45870 does not look round unless the mark is drawn in such a way as to be elongated further as the mark is drawn in a farther position from the vehicle. As a result, the light is diffused so excessively in a front-to-rear direction that the mark disappears, resulting in fears that the pedestrian carelessly enters the road along which the vehicle is approaching without recognizing the fact that the vehicle is approaching.

SUMMARY OF THE INVENTION

In view of the problem described above, the present invention provides a road surface drawing lamp unit configured to display a simple diagrammatic pattern that is easy to be recognized by a pedestrian in a predetermined position on a road surface of a road along which a vehicle is driven so that a pedestrian who is at a blind spot, invisible to the driver, on a road that intersects the road along which the vehicle is approaching can recognize quickly and accurately a fact that the vehicle is approaching and a direction in which the vehicle is approaching.

A road surface drawing lamp unit includes a light source module in which a plurality of light sources which correspond individually to drawing patterns, long in a first direction which is a width direction of a road and short in a second direction which intersects the width direction of the road and an emitting axis of the light sources, are arranged so that the drawing patterns are drawn at a plurality of locations on the road along the second direction and the light sources are formed so as to be turned on and off independently and an optical system which emits light emitted from the light sources to the front.

(Function) As a result of the drawing patterns which are short in depth (the length in the extending direction of the road) relative to the width being formed to the front of the vehicle along the direction in which the road extends, even though the drawing patterns are drawn in a position lying farther away from the vehicle, the light is made difficult to diffuse, and the drawing patterns having the clear outline and made long in the width direction are formed on the road surface which lies ahead of and farther away from the vehicle.

In the road surface drawing lamp unit, drawing patterns which extend in a rod-like fashion in the width direction of the road are formed sequentially along the second direction.

(Function) Since the rod-shaped drawing patterns are formed short in depth relative to width, even though the drawing patterns are drawn in the position lying farther away from the vehicle, the light is made difficult to diffuse in the front-to-rear direction. Additionally, the rod-shaped drawing patterns which are formed sequentially along the vertical direction are recognized by the pedestrian who is on the road as marks moving along the traveling direction of the vehicle on the road surface.

In the road surface drawing lamp unit, a drawing pattern which is shone farther away from a vehicle is drawn shorter in the second direction than a drawing pattern which is shone nearer to the vehicle.

Normally, a drawing pattern which is shone on a road surface lying far away from a vehicle is drawn as having a greater depth in an extending direction of a road than a drawing pattern which is drawn on a road surface lying near to the vehicle. Therefore, light which forms the drawing pattern drawn on the road surface lying far away from the vehicle tends to diffuse more easily in the extending direction of the road than light which forms the drawing pattern drawn on the road surface lying near to the vehicle.

(Function) However, in the event that the length of a drawing pattern which is drawn farther away from the vehicle in relation to the second direction (the direction which intersects the width direction of the road and the emitting axis of the light sources at right angles) is formed shorter than the length of a drawing pattern which is drawn nearer to the vehicle in relation to the second direction, drawing patterns drawn on the road surface spread uniformly irrespective of distances from the vehicle to positions where the drawing patterns are drawn, whereby the pedestrian is allowed to see the rod-shaped drawing patterns having similar shapes moving along the traveling direction of the vehicle.

In the road surface drawing lamp unit, the light sources emit pencils of light which spread in a rectangular range which extends in the width direction of the road towards the optical system, and the optical system forms rod-shaped drawing patterns from the pencils of light to the front of the vehicle.

(Function) The optical system changes the pencils of light which diffuse in the rectangular range into the pencils of light which converge to the rod-shaped range for emission to the road surface lying ahead of the vehicle, whereby the drawing patterns which extend in the rod-like fashion in the width direction of the road are formed ahead of the vehicle. The outlines of the rod-shaped drawing patterns are made difficult to collapse even though they are drawn in positions lying far away from the vehicle.

In the road surface drawing lamp unit, the optical system is made up of a projection lens or a reflecting mirror.

(Function) The projection lens or the reflecting mirror forms the drawing patterns which are shorter in the front-to-rear direction than the width ahead of the vehicle, whereby in the drawing patterns drawn on the road surface, even though they are formed in positions lying far away from the vehicle, the light forming the drawing patterns is made difficult to diffuse in the front-to-rear direction, whereby the drawing patterns having the clear outline and made long in the width direction are drawn on the road surface lying far away from the vehicle.

According to the road surface drawing lamp unit, since the outlines of the drawing patterns do not collapse even though the drawing patterns are formed on the road surface lying far away from the vehicle, the pedestrian walking or standing on the road can realize the drawing patterns as information informing him or her of the approach of the vehicle quickly and accurately.

According to the road surface drawing lamp unit, the pedestrian can realize the approach of the vehicle more quickly and accurately by seeing the marks having the clear outlines moving in the traveling direction of the vehicle.

According to the road surface drawing lamp unit, the pedestrian can realize the approach of the vehicle more quickly and accurately by recognizing that the rod-shaped drawing patterns which are similar in shape are moving in the traveling direction of the vehicle.

According to the road surface drawing lamp unit, since the outlines of the drawing patterns do not collapse even though the drawing patterns are drawn on the road surface lying far from the vehicle, the pedestrian walking or standing on the road can realize the drawing patterns as information informing him or her of the approach of the vehicle quickly and accurately.

According to the road surface drawing lamp unit, by looking at the drawing patterns drawn on the road surface whose outlines are made difficult to collapse, the pedestrian walking or standing on the road can realize the drawing patterns as information informing him or her of the approach of the vehicle quickly and accurately.

DETAILED DESCRIPTION

Figure 1:
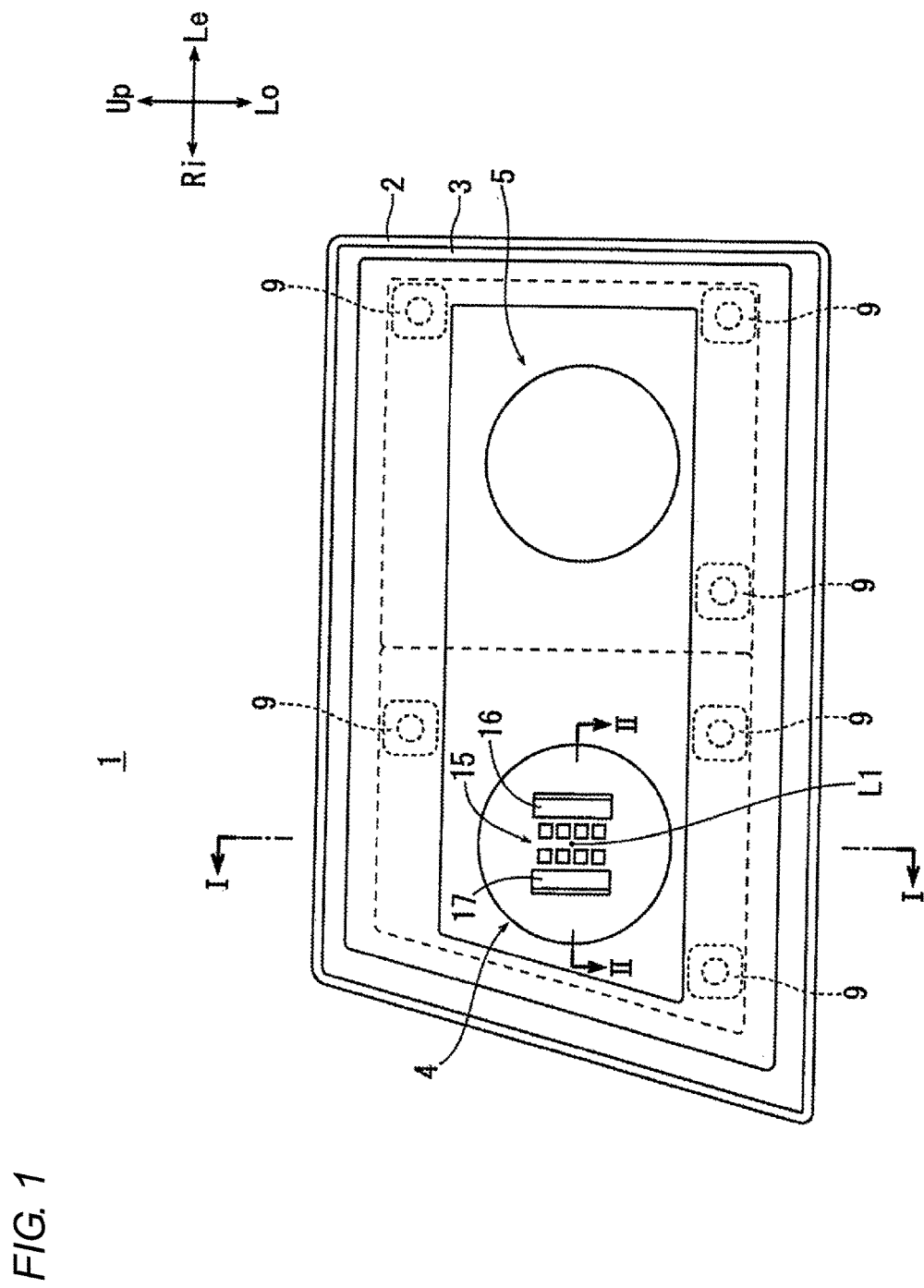
FIG. 1 is a front view of a vehicle lamp which installs a road surface drawing lamp unit of a first embodiment.

Hereinafter, embodiments of the present invention will be described based on FIGS. 1 to 9. In these figures, various directions, that is, upper, lower, left, right, front and rear directions of a vehicle and a road surface drawing lamp unit assumed as seen from a driver's seat will be described as Up, Lo, Le, Ri, Fr and Re, respectively.

FIGS. 1 to 3B show a vehicle lamp 1 which includes a first embodiment of a road surface drawing lamp unit. The vehicle lamp 1 represents an example of a right headlamp and includes a lamp body 2 having an opening portion at a side which faces the front of a vehicle and a transparent or translucent front cover 3 which closes the opening portion. A road surface drawing lamp unit 4 of the first embodiment, a light distribution pattern forming light source unit 5, aiming brackets (6, 7), a swivel unit 8, a plurality of aiming screws 9, extension reflectors 10 and a control unit 11 are accommodated in an interior of a lamp compartment S which is defined inside the lamp body 2 and the front cover 3. Where to dispose the road surface drawing lamp unit 4 is not limited to the interior of the vehicle lamp 1, and hence, the road surface drawing lamp unit 4 may be provided outside the vehicle lamp 1 such as on a roof of the vehicle (not shown), for example.

The road surface drawing lamp unit 4 shown in FIGS. 1 to 3B has the control unit 11, a light source module 12, and a transparent toric lens 13 (a projection lens) which is an optical system. The light source module 12 is made up of a metallic lens holder 14, an LED array 15 which makes up a light source and a pair of reflectors (16, 17).

Figure 2:
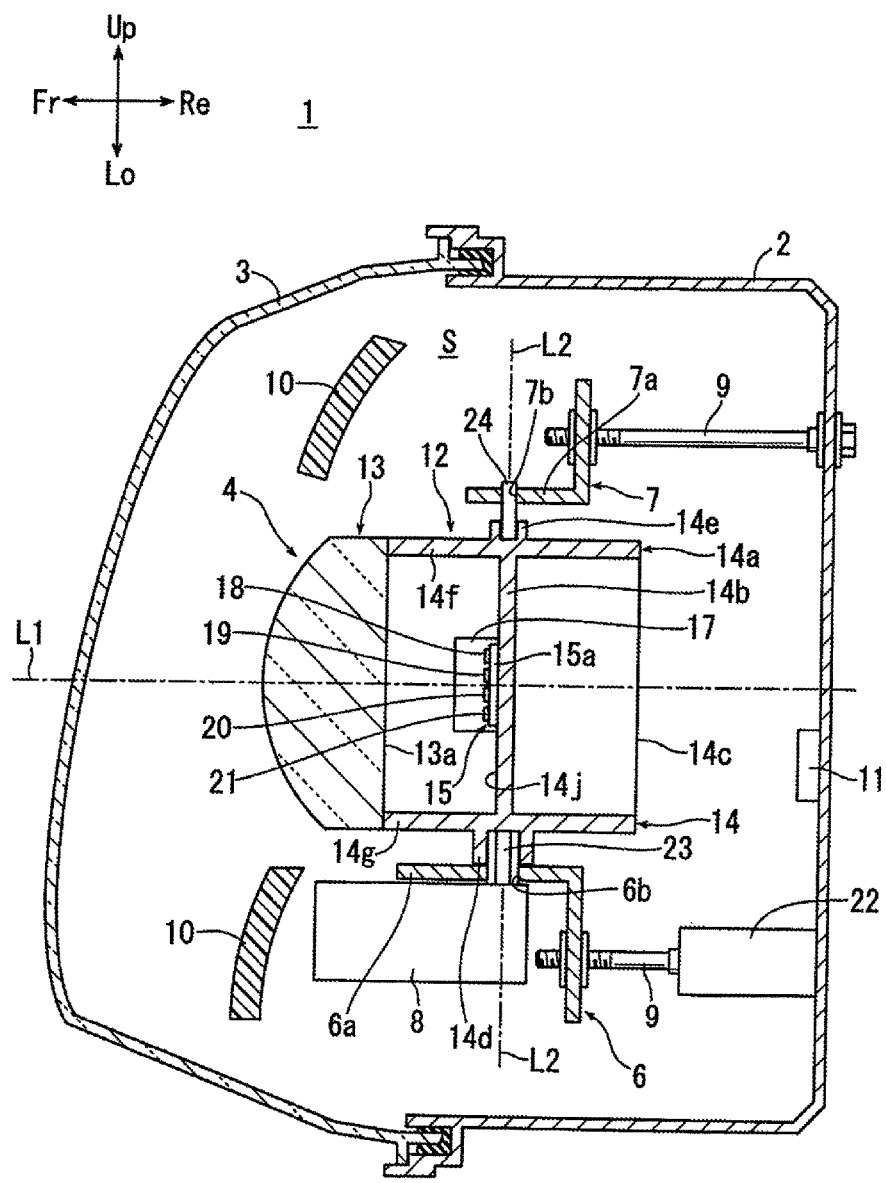
FIG. 2 is a sectional view taken along a line I-I in FIG. 1.
Figure 3A:
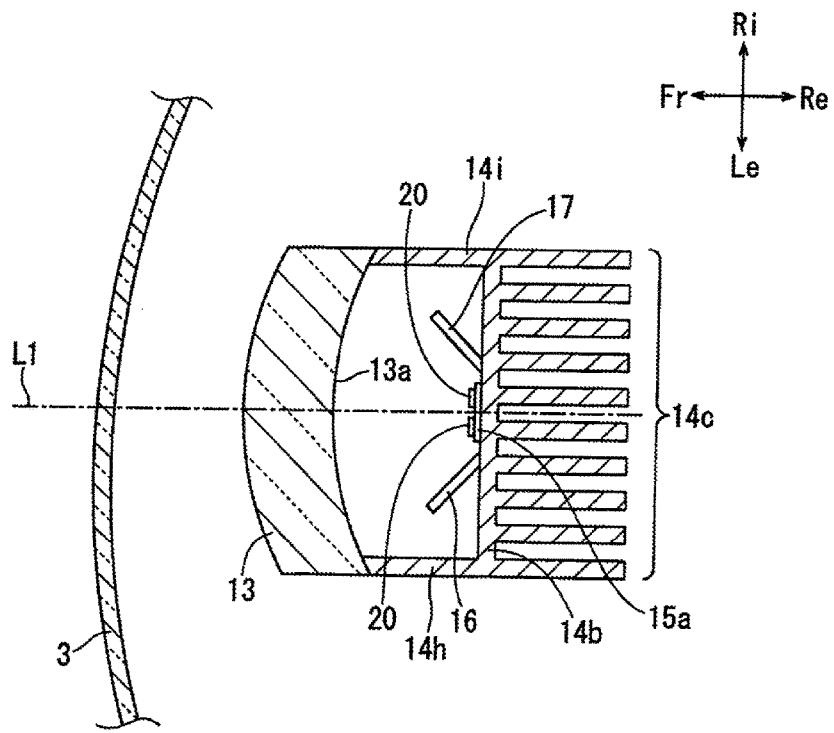
FIG. 3A is a sectional view taken along a line II-II in FIG. 1
Figure 3B:
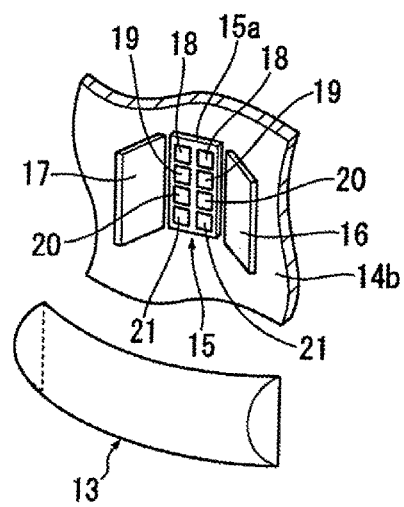
FIG. 3B is a perspective view of light sources and a projection lens as seen from the front of a vehicle.

As shown in FIGS. 2, 3A and 3B, the lens holder 14 is made up of a hollow box-shaped main body portion 14a, a light source support portion 14b, a plurality of heat dissipating fins 14c and bearing portions (14d, 14e). The main body portion 14a is made up of a top plate 14f, a bottom plate 14g, and left and right side plates (14h, 14i). The bearing portions (14d, 14e) are formed on outer sides of the bottom plate 14g and the top plate 14f, respectively, and are attached to a first and second swivel shafts (23, 24), which will be described later. The light source support portion 14b is formed integrally on an inner side of the main body portion 14a as a partition plate which is at right angles to the top plate 14f, the bottom plate 14g and the left and right side plates (14h, 14i). The LED array 15 is attached to a front surface 14j of the light source support portion 14b via a substrate 15a, and the plurality of heat dissipating fins 14c are provided on a rear surface of the light source support portion 14b so as to extend to the rear in parallel to one another. An opening portion at a front end of the main body portion 14a is closed by the toric lens 13 which is attached to the front end of the main body portion 14a.

The LED array 15 is disposed near a rear focal point of the toric lens 13, and a rear surface 13a of the toric lens 13 faces the LED array 15 as shown in FIG. 3A. Light of the LED array 15 passes through the toric lens 13 and the front cover 3 and displays a drawing pattern on a road surface lying ahead of the vehicle. In addition to the toric lens 13 of the first embodiment, a cylindrical lens can also be adopted as a projection lens of the light source module 12. However, it is most desirable to adopt a toric lens. Although a toric lens and a cylindrical lens are similar in displaying a belt-shaped or rod-shaped drawing pattern which is long in a width direction of a road (a left-to-right direction of the vehicle) and short in an extending direction of the road, the cylindrical lens cannot form a drawing pattern having a uniform depth because in a drawing pattern formed thereby, a depth gradually decreases towards a center of the drawing pattern, whereas the toric lens can form a drawing pattern having a uniform depth in the extending direction of the road, and therefore, the toric lens is more desirable than the cylindrical lens in displaying a clearer belt-shaped or rod-shaped drawing pattern.

The LED array 15 of the first embodiment is formed by arranging a plurality of combinations of LED light emitting elements each made up of a plurality of vertically arranged white and green LED light emitting elements (18 to 21) laterally in a horizontal direction on a front surface of the substrate 15a. The LED light emitting elements (18 to 21) are disposed so as to be oriented in the same direction and are controlled so as to be turned on and off independently by the control unit 11. Although only one combination of a plurality of LED light emitting elements (18 to 21) which are arranged vertically may be provided, in order to display a drawing pattern which is long in the width direction of the road, it is desirable to arrange a plurality of such combinations of LED light emitting elements laterally in the horizontal direction to diffuse light with sufficient luminous flux in the width direction of the road. In the first embodiment, two combinations of four vertically arranged LED light emitting elements (18 to 21) are arranged laterally in the horizontal direction. However, the number of LED light emitting elements which are arranged in the vertical direction and the number of combinations of LED light emitting elements which are arranged laterally in the horizontal direction are not limited thereto.

The reflectors (16, 17) are provided on left- and right-hand sides of the LED light emitting elements (18 to 21) on the light source support portion 14b of the lens holder 14. The reflectors (16, 17) are formed so as to extend in a plate-like fashion in such a way as to move away from each other as they extend obliquely forwards from the light source support portion 14b to thereby cover the LED light emitting elements (18 to 21) from the left- and right-hand sides thereof. The reflectors (16, 17) reflect light emitted from the LED light emitting elements (18 to 21) towards the rear surface 13a of the toric lens 13 so that the light is not incident on the left and right side plates (14h, 14i) of the lens holder 14 to thereby limit the lateral diffusion of the light emitted from the LED light emitting elements (18 to 21).

The light emitted from the LED array 15 diffuses about an emitting axis L1 (an axis which passes through a vertical and horizontal center of a shining range by pencils of light of all the LED light emitting elements (18 to 21)) and is emitted to the front of the vehicle through the toric lens 13 and the front cover to form a drawing pattern.

The light source module 12 to which the toric lens 13 is fixed is attached to the lamp body 2 by the aiming brackets (6, 7), the swivel unit 8 and the plurality of aiming screws 9. Three aiming screws 9 are provided for each of the road surface drawing lamp unit 4 and the light distribution pattern forming light source unit 5 and are attached to the lamp body 2. One of the three aiming screws 9 of each of the road surface drawing lamp unit 4 and the light distribution pattern forming light source unit 5 is made to reciprocate back and forth by a motor unit 22, whereby the road surface drawing lamp unit 4 and the light distribution pattern forming light source unit 5 are independently tilted vertically.

The aiming brackets (6, 7) each have a plate-like shape. The aiming brackets (6, 7) are supported by the aiming screws 9 at one end thereof, and shaft attaching portions (6a, 7a) at the other end of the timing brackets (6, 7) are bent towards the front. The swivel unit 8 is fixed to the aiming bracket 6 which is provided below the road surface drawing lamp unit 4, and the swivel unit 8 rotates the first swivel shaft 23 by the use of a motor incorporated therein. The first swivel shaft 23 projects upwards from a hole 6b formed in the shaft attaching portion 6a to be fixed to the bearing portion 14d of the lens holder 14. A hole 7b is provided in the shaft attaching portion 7a of the aiming bracket 7 which is provided above the road surface drawing lamp unit 4. The second swivel shaft 24 is fixed to the bearing portion 14e of the lens holder 14, and the second swivel shaft 24 is held rotatably to the shaft attaching portion 7a of the aiming bracket 7 via the hole 7b.

The road surface drawing lamp unit 4 is supported rotatably on the aiming brackets (6, 7) via the first and second swivel shafts (23, 24) and swivels horizontally to the left and right about a center axis L2 of the first and second swivel shafts (23, 24) by rotating the first swivel shaft 23 by means of a drive source (a motor) of the swivel unit 8.

Figure 4:
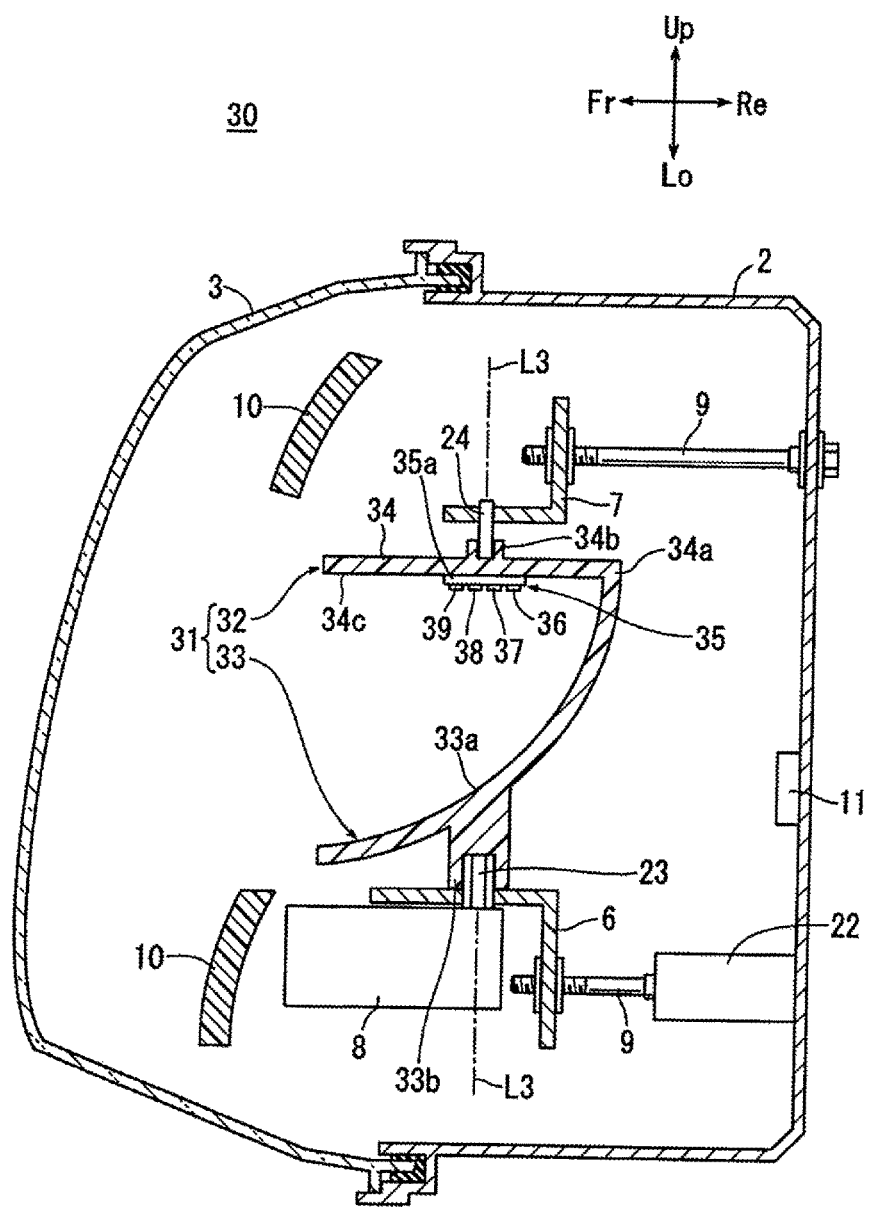
FIG. 4 is a vertical sectional view of a vehicle lamp which installs a road surface drawing lamp unit of a second embodiment.

Next, a road surface drawing lamp unit of a second embodiment will be described. FIG. 4 shows a vehicle lamp 30 including a road surface drawing lamp unit 31 of the second embodiment. The vehicle lamp unit 30 of the second embodiment has the same configuration as that of the vehicle lamp 1 of the first embodiment excluding the road surface drawing lamp unit 31.

The road surface drawing lamp unit 31 shown in FIG. 4 has a control unit 11, a light source module 32 and a reflector 33 which is an optical system. The light source module 32 is made up of a resin light source support portion 34 and an LED array 35. The reflector 33 is formed integrally on the light source support portion 34 at a rear end portion 34a thereof and is disposed below the light source support portion 34. The reflector 33 is formed into a paraboloidal shape and has a reflecting surface 33a which is formed by aluminum deposition or the like on a front surface thereof. Similar to the road surface drawing lamp unit 4 of the first embodiment, the road surface drawing lamp unit 30 may also be provided outside the vehicle lamp 30 (for example, on a roof of a vehicle, not shown).

As shown in FIG. 4, the LED array 35 is attached to a lower surface 34c of the light source support portion 34 via a substrate 35a. The LED array 35 is formed by arranging a plurality of combinations of LED light emitting elements each made up of a plurality of white and green LED light emitting elements (36 to 39) which are arranged to be aligned from the rear to the front on a lower surface of the substrate 35a. The LED light emitting elements (36 to 39) are disposed so as to be oriented in the same direction and are controlled so as to be turned on and off independently by the control unit 11. Although only one combination of a plurality of LED light emitting elements (36 to 39) which are arranged to be aligned from the rear to the front may be provided, it is desirable to arrange a plurality of such combinations of LED light emitting elements laterally in the horizontal direction. In the second embodiment, two combinations of four LED light emitting elements (36 to 39) which are arranged in the front-to-rear direction are arranged laterally in the horizontal direction (the combination of a left side LED is omitted). However, the number of LED light emitting elements which are arranged in the front-to-rear direction and the number of combinations of LED light emitting elements which are arranged laterally in the horizontal direction are not limited thereto.

Figure 7:
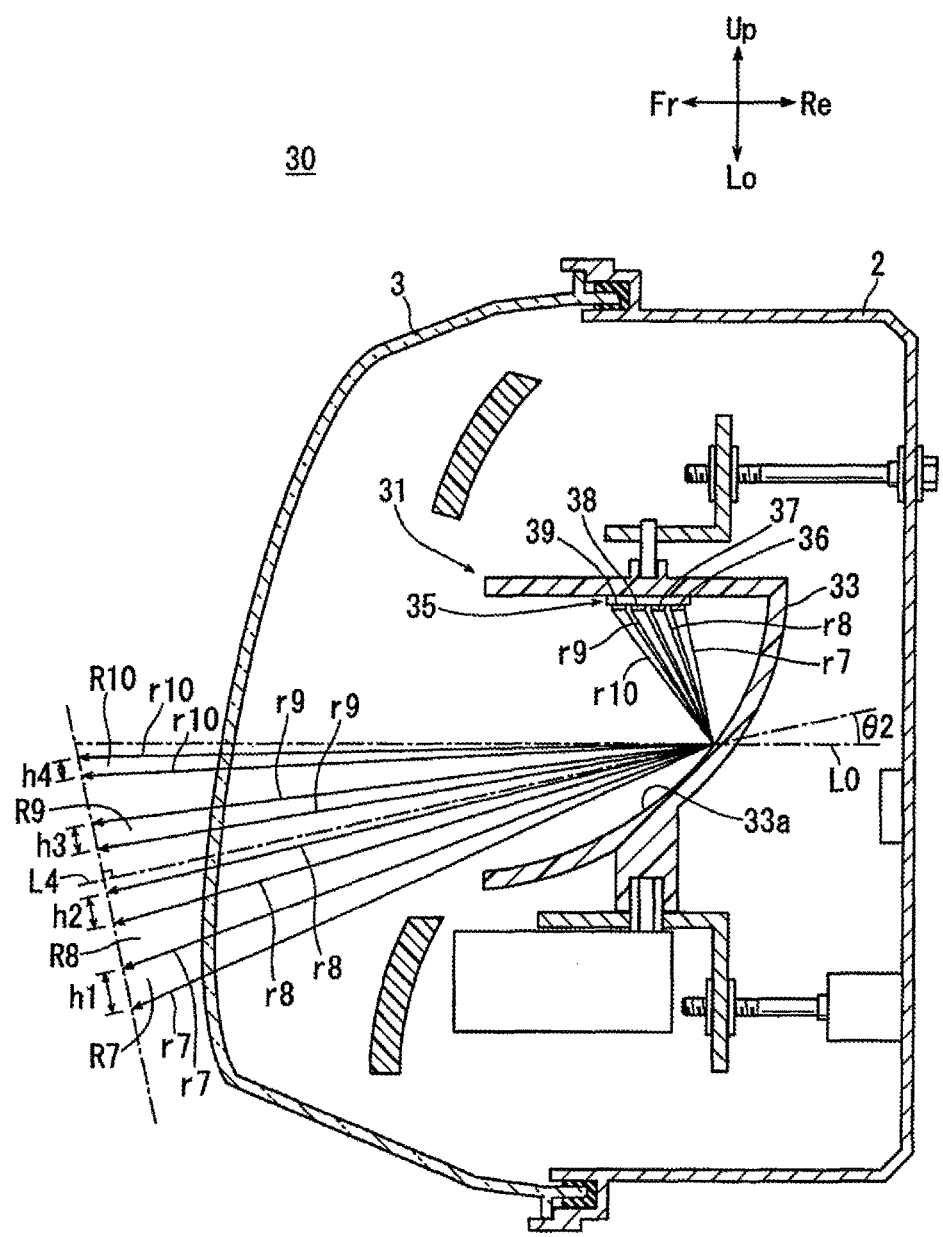
FIG. 7 is an explanatory diagram showing an optical path pattern in vertical section which is formed by the road surface drawing lamp unit of the second embodiment.

Light emitted from the LED array 35 is reflected to the front by the reflecting surface 33*a* of the reflector 33 and then diffuses about an emitting axis L4 (an axis which passes through a vertical and horizontal center of a shining range of pencils of light which are emitted from all the LED light emitting elements (36 to 39) and are then reflected by the reflector 33. Refer to FIG. 7). Then, the light is emitted to the front from the front cover and forms a predetermined drawing pattern on a road surface lying ahead of the vehicle.

Additionally, a bearing portion 33*b* is provided on an outer side of the reflector 33, and a bearing portion 34*b* is provided on an outer side of the light source support portion 34 so as to be coaxial (along a center axis L3) with the bearing portion 34*b*. The road surface drawing lamp unit 31 is supported on the lamp body 2 so as to rotate around the center axis L3 which extends vertically by the first swivel shaft 23 being fixed to the bearing portion 33*b* and the second swivel shaft 24 being fixed to the bearing portion 34*b* and swivels laterally in the horizontal direction about the center axis L3 as the swivel unit 8 is driven.

Figure 5:
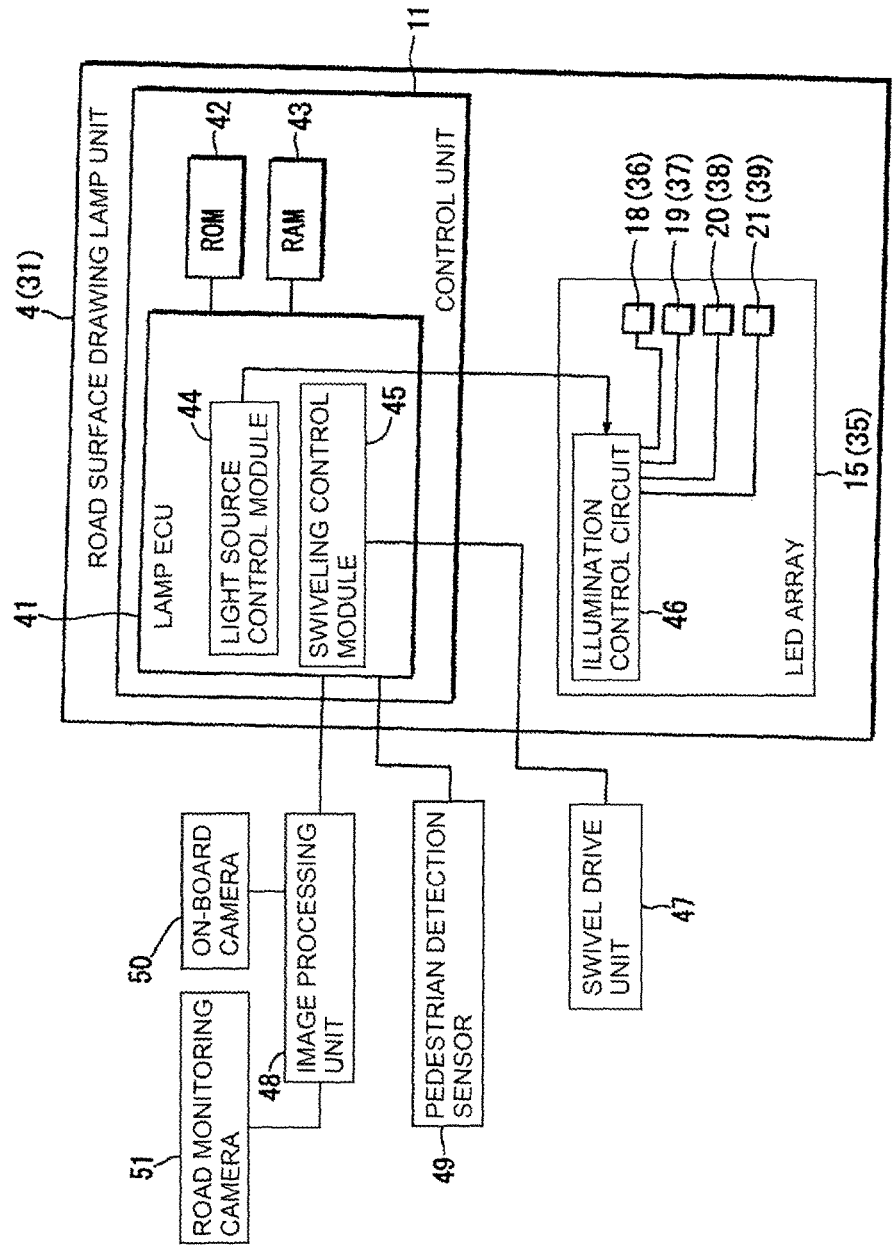
FIG. 5 is a block diagram explaining a control unit.

Next, referring to FIG. 5, the control unit 11 will be described. The control unit 11 has a lamp ECU (Electronic Control Unit) 41, a ROM 42 and a RAM 43. The lamp ECU 41 has a light source control module 44 and a swiveling control module 45. Various control programs are recorded in the ROM 42, and the lamp ECU 41 executes the control programs recorded in the ROM 42 at the RAM 43 to generate various control signals.

The light source control module 44 is connected to the LED light emitting elements (18 to 21) of the first embodiment or the LED light emitting elements (36 to 39) of the second embodiment via an illumination control circuit 46 of the LED array 15 (the LED array 35 in the second embodiment). The swiveling control module 45 is connected to a swivel drive unit 47 which drives the drive source (the motor, not shown) of the swivel unit 8. The swivel drive unit 47 rotates the first swivel shaft 23 shown in FIGS. 2 and 4 about the center axis L2 based on a control signal of the lamp ECU 41 so as to swivel the road surface drawing lamp unit 4 (the road surface drawing lamp unit 31 in the second embodiment) laterally in the horizontal direction.

The light source control module 44 controls so that the LED light emitting elements (18 to 21) which are arranged vertically in the first embodiment and the LED light emitting elements (36 to 39) which are arranged in the front-to-rear direction in the second embodiment are turned on and off individually and independently. Additionally, since the plurality of LED light emitting elements (18 to 21) and the plurality of LED light emitting elements (36 to 39) are provided laterally in the horizontal direction in the first and second embodiments, the light source control module 44 controls so that the LED light emitting elements which are aligned laterally in the horizontal direction in the same raw are turned on and off at the same time or individually and independently. Turning on and off independently the LED light emitting elements which are arranged laterally in the horizontal direction is desirable in changing the width of a drawing pattern based on the number of LED light emitting elements which are turned on and in forming a plurality of drawing patterns which are divided laterally in the horizontal direction by forming a turned off portion between the LED light emitting elements which are turned on continuously (this being limited only to a case where three or more combinations of LED light emitting elements are arranged laterally in the horizontal direction).

An image processing unit 48 and a pedestrian detection sensor 49 are connected to the lamp ECU 41. An on-board camera 50 and a road monitoring camera 51 are connected to the image processing unit 48, and the road monitoring camera 51 is connected to the image processing unit 48 via a communication line such as an internet. The on-board camera 50 is mounted on the vehicle together with the road surface drawing lamp unit (4, 31). The road monitoring camera 51 includes an intersection camera which is disposed at an intersection and a monitoring camera which is set near the road.

The pedestrian detection sensor 49 sends detection data of a pedestrian on the road to the lamp ECU 41, and the on-board camera 50 and the road monitoring camera 51 send imaging data in relation to a pedestrian existing near the vehicle to the image processing unit 48. In the event that a pedestrian on the road is detected by the pedestrian detection sensor 49 and that an image of the pedestrian on the road is obtained as a result of the analysis by the image processing unit 48, the lamp ECU 41 controls the illumination control circuit 46 of the LED array (15, 35) and the swivel drive unit 47 so that a predetermined drawing pattern is drawn in a predetermined position on the road to warn the pedestrian on the road or a driver of another vehicle.

Figure 6A:
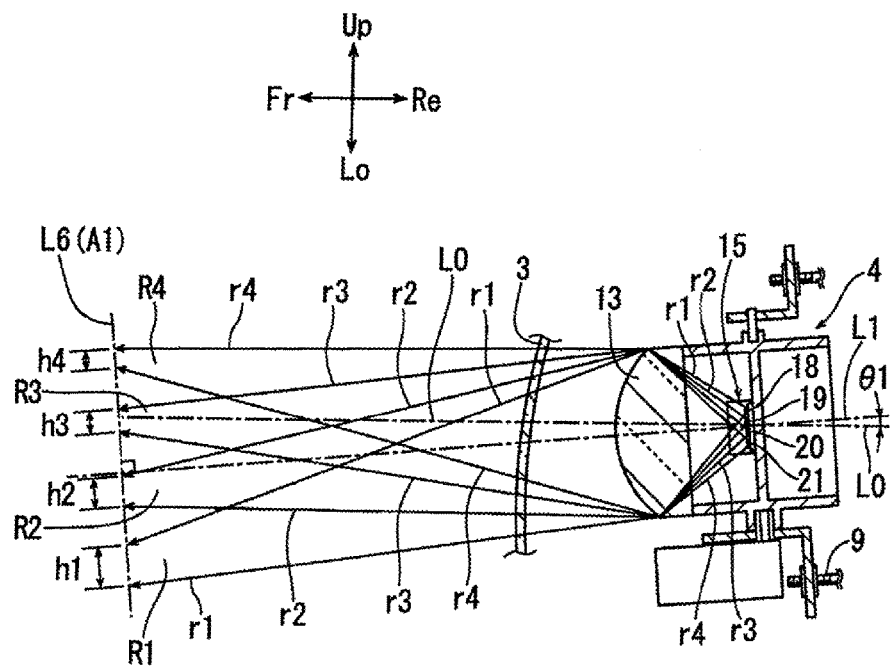
FIG. 6A is an explanatory diagram showing an optical path pattern in vertical section which is formed by the road surface drawing lamp unit of the first embodiment.
Figure 6B:
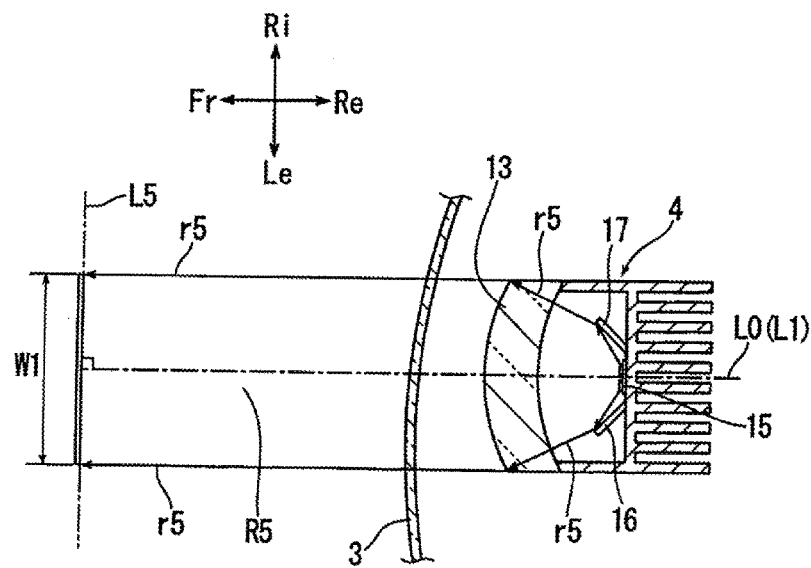
FIG. 6B is an explanatory diagram showing the optical path pattern in horizontal section which is formed by the road surface drawing lamp unit of the first embodiment.

Next, referring to FIGS. 6A to 9, the shapes of road surface drawing patterns which are drawn by the first and second road surface drawing lamp units (4, 31) will be described. Reference numeral L5 denotes an axis which extends in the width direction (a first direction) of the road, and reference numeral L6 in FIG. 8 denotes an axis (a second direction) which intersects both the axis L5 in the width direction of the road and the emitting axis L1 (L4 in FIG. 7) at right angles. FIG. 6A shows an optical path pattern on a vertical section of the road surface drawing lamp unit 4 of the first embodiment, and FIG. 6B shows an optical path pattern on a horizontal section of the road surface drawing lamp unit 4.

The road surface drawing lamp unit 4 of the first embodiment shown in FIG. 6A is tilted down so that the emitting axis L1 of the LED light emitting elements (18 to 21) which are light sources is directed downwards by an angle A1 relative to a horizontal axis L0 of the LED array 15 which extends in the front-to-rear direction of the vehicle by the motor unit 22 (refer to FIG. 2) to which the aiming screw 9 is attached. In FIG. 6A, light rays emitted from the LED light emitting elements (18 to 21) which are arranged sequentially downwards in the vertical direction will be referred to as r1 to r4, respectively, and pencils of light formed by the light rays r1 to r4 will be referred to as R1 to R4, respectively. In FIG. 6B, light rays emitted by the combinations of LED light emitting elements (18 to 21) which are arranged laterally in the horizontal direction will be referred to as r5, and a pencil of light formed by the light rays r5 will be referred to as R5.

The pencils of right R1 to R4 in FIG. 6A pass through the toric lens 13 to thereby be caused to converge to heights h1 to h4 which are defined along an axis L6, respectively, and then pass through the front cover 3 to display a drawing pattern on a road surface lying ahead of the vehicle in a vertically inverted fashion. The pencil of light R5 in FIG. 6B passes through the toric lens 13 to thereby be caused to converge to a width W1 and then passes through the front cover 3 to display a rod-shaped or belt-shaped drawing pattern on the road surface lying ahead of the vehicle.

FIG. 7 shows an optical path pattern on a vertical section formed by the road surface drawing lamp unit 31 of the second embodiment. In the reflector 33 of the road surface drawing lamp unit 31 of the second embodiment shown in FIG. 7, the reflecting surface 33a is formed so that the emitting axis L4 of the reflected light resulting when the light emitted from the LED light emitting elements (36 to 39) which are light sources is reflected is directed downwards by an angle 82 relative to a horizontal axis L0 which extends in the front-to-rear direction of the vehicle. In FIG. 7, light rays emitted from the LED light emitting elements (36 to 39) which are arranged to be aligned sequentially from the rear to the front will be referred to as r7 to r10, respectively, and pencils of light formed by the light rays r7 to r10 will be referred to as R7 to R10, respectively. In FIG. 7, the pencils of light R7 to R10 are reflected by the reflecting surface 33a so as to converge to heights h1 to h4, respectively, which are defined along an axis L6 to display a drawing pattern on the road surface lying ahead of the vehicle. Distances from the vehicle to the drawing patterns drawn on the road surface by the pencils of light R7 to R10 are proportional to distances from the positions of LED light emitting elements (36 to 39) to the reflecting surface 33a. Since the LED light emitting elements (36 to 39) are set so as to gradually move away from the reflecting surface 33a, the drawing patterns drawn by the pencils of light (R7 to R10) are displayed on the road surface so as to be offset in the front-to-rear direction along the traveling direction of the vehicle according to the longitudinal arrangement of the LED light emitting elements (36 to 39).

Figure 8:
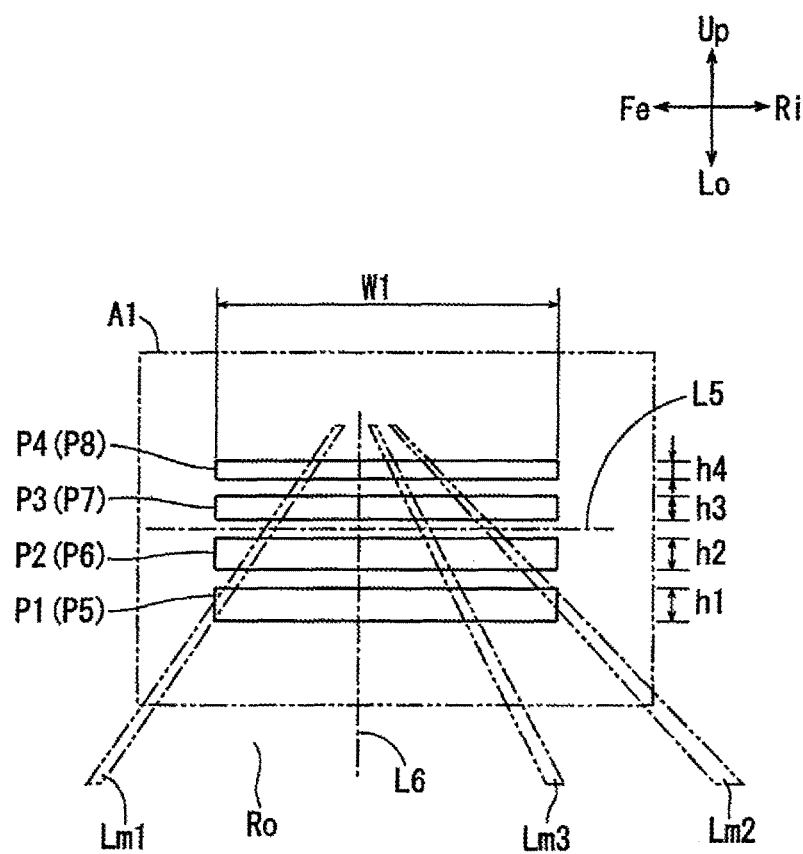
FIG. 8 is an explanatory diagram in relation to shapes of drawing patterns which are projected from light emitting elements onto an imaginary plane which is at right angles to optical axes of the light sources.

FIG. 8 shows drawing patterns P1 to P4 (drawing patterns P5 to P8 in the second embodiment shown in FIG. 7) drawn by the LED light emitting elements 18 to 21 (the LED light emitting elements 36 to 39 in the second embodiment shown in FIG. 7) on the assumption that an imaginary plane A1 exists which intersects the emitting axis L1 (the emitting axis L4 in the second embodiment shown in FIG. 7) in FIG. 6A at right angles.

As shown in FIG. 6A, the pencils of light (R1 to R4) formed by the LED light emitting elements (18 to 21) of the first embodiment which are arranged sequentially downwards in the vertical direction are shone to the front of the vehicle in the vertically inverted fashion to draw the drawing patterns (P1 to P4) sequentially upwards according to the arrangement of the light emitting elements towards the imaginary plane A1.

Additionally, as shown in FIG. 7, the pencils of light (R7 to R10) formed by the LED light emitting elements (36 to 39) of the second embodiment which are arranged sequentially from the rear to the front of the vehicle are reflected to the front by the reflecting surface 33a of the reflector 33 to draw the drawing patterns (P5 to P8) sequentially upwards according to the arrangement of the light emitting elements towards the imaginary plane A1.

The drawing patterns (P1 to P4) and the drawing patterns (P5 to P8) on the imaginary plane A1 are drawn so as to be long in the first direction (the direction along the axis L5) which is the width direction of the road and short in the second direction (the direction along the axis L6) which intersects both the axis L5 and the emitting axis L1 at right angles, whereby the resulting drawing patterns are formed into a rod- or belt-like shape. In FIGS. 6A to 8, reference numeral W1 denotes widths W1 of the drawing patterns (P1 to P4) and the drawing patterns (P5 to P8), and reference numerals h1 to h4 denote heights of the drawing patterns (P1 to P4) and the drawing patterns (P5 to P8) within the imaginary plane A1. In the event of the belt-shaped or rod-shaped drawing patterns (P1 to P4) and drawing patterns (P5 to P8) being drawn, for example, on a road having two driving lanes where the subject vehicle can be driven so as to spread to the full width of one driving lane having a width of 4 meters, W1=4 m, h1=h2=h3=h4=0.5 m. Then, the toric lens 13 is formed and the LED light emitting elements (18 to 21) are disposed in the first embodiment and the reflecting surface 33a of the reflector 33 is formed and the LED light emitting elements (36 to 39) are disposed in the second embodiment so that the width W1 is formed sufficiently long relative to the heights h1 to h4 in the second direction.

In the belt-shaped or rod-shaped drawing patterns (P1 to P4) and drawing patterns (P5 to P8) which are drawn on the road surface in the way described above, the density of the pencils of light in the second direction of the imaginary plane A1 becomes dense, and therefore, in case the pencils of light are shone obliquely downwards towards the road surface, it becomes difficult for the pencils of light to be diffused in the front-to-rear direction, whereby the pencils of light are allowed to have a clear outline. The belt-shaped or rod-shaped drawing patterns (P1 to P4) and drawing patterns (P5 to P8) which are clearly outlined move in the traveling direction of the vehicle together with the vehicle, whereby the pedestrian can recognize accurately the fact that the vehicle is approaching.

It becomes easier for the belt-shaped or rod-shaped drawing patterns (P1 to P4) and drawing patterns (P5 to P8) to diffuse in the traveling direction of the vehicle as they are drawn farther from the vehicle, and therefore, in the event of the heights of the drawing patterns (P1 to P8) on the imaginary plane A1 being made uniform, the depths of the drawing patterns which are drawn farther from the vehicle tend to be increased, resulting in a problem that their outlines get less sharp.

Then, as shown in FIGS. 6A to 9, in the first and second embodiments, it is more desirable that the belt-shaped or rod-shaped drawing patterns (P1 to P4) and drawing patterns (P5 to P8) which are displayed on the imaginary plane A1 are displayed so that the respective heights of the drawing patterns become h1>h2>h3>h4. On the imaginary plane A1, the drawing patterns which are drawn upper are drawn farther than the drawing patterns which are drawn lower. Consequently, in the event that the drawing patterns which are drawn upper on the imaginary plane A1 are made shorter in height than the drawing patterns which are drawn lower on the same plane, the diffusion in the traveling direction of the vehicle can be restricted, thereby making it possible to make the depths of the drawing patterns drawn actually on the road surface uniform.

Figure 9:
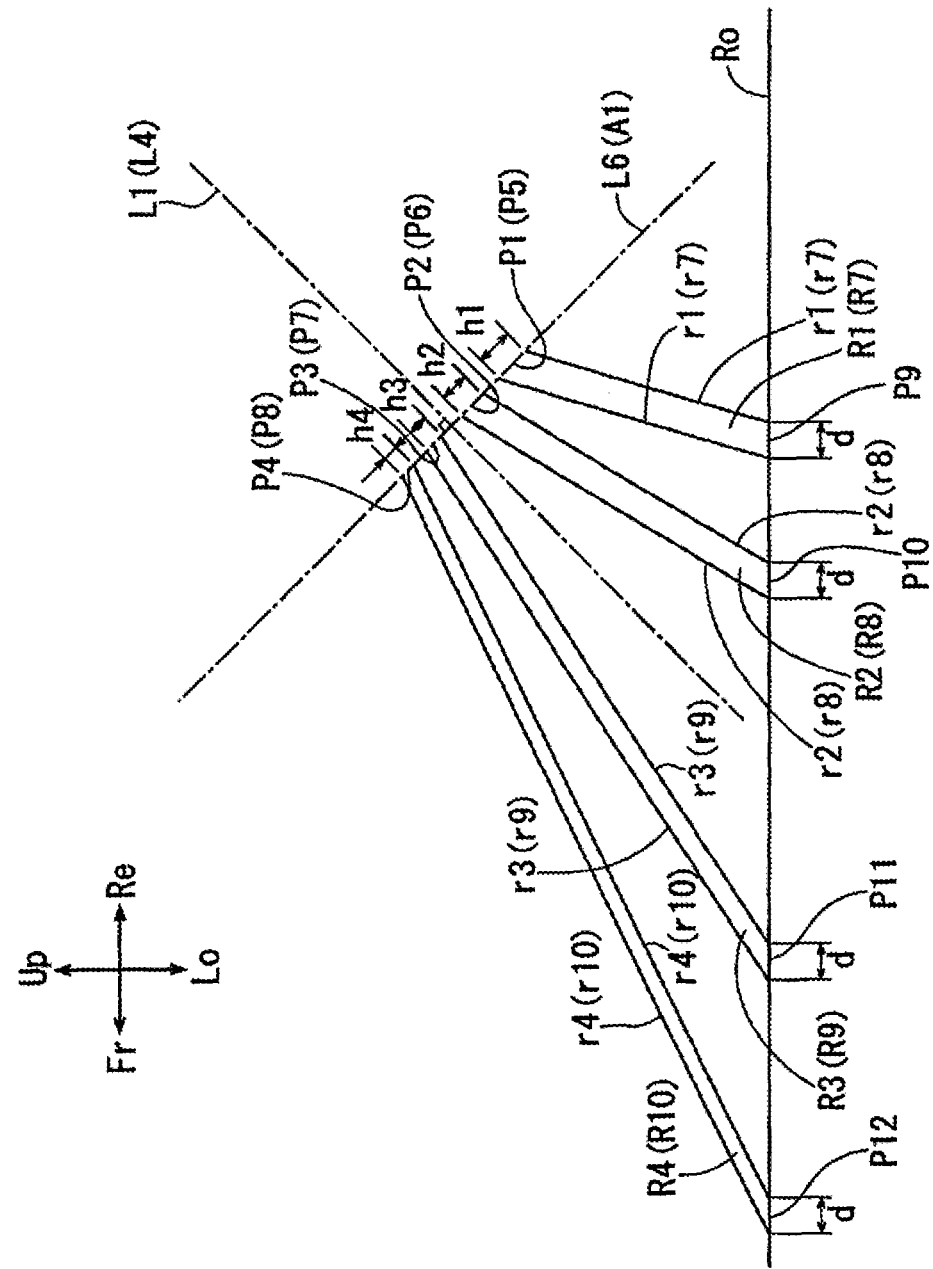
FIG. 9 is an explanatory diagram in relation to depths of drawing patterns which are drawn on a road surface after passing through the imaginary plane.

FIG. 9 shows depths d of drawing patterns (P9 to P12) which are drawn on a road surface Ro so as to be arranged in the front-to-rear direction by the pencils of light (R1 to R4, R7 to R10) which pass through the imaginary plane A1. In the first and second embodiments, the toric lens 13 and the reflecting surface 33a of the reflector 33 are formed and the LED light emitting elements (18 to 21, 36 to 39) are disposed so that the heights of the rod-shaped drawing patterns (P1 to P4) and drawing patterns (P5 to P8) which are displayed on the imaginary plane A1 become h1>h2>h3>h4, whereby the depths of the drawing patterns (P9 to P12) drawing individually on the road surface Ro can be made uniform.

In FIGS. 6A to 8, the drawing patterns (P1 to P4) and drawing patterns (P5 to P8) are displayed on the imaginary plane A1 with a clearance C1 provided vertically therebetween, and the drawing patterns (P9 to P12) are displayed on the road surface Ro with a clearance C2 provided vertically therebetween. However, the clearances (C1, C2) are provided as a matter of convenience to visualize the difference in the heights h1 to h4 and the influences imposed by the difference in the heights for the sake of easy understanding, and therefore, the actual drawing patterns (P1 to P12) may be formed continuously without such clearances or may be formed in a partially overlapping fashion. As this occurs, it is possible to form a combined drawing pattern which has a clear outline and a deep depth.

In the first and second embodiments, although the belt-shaped or rod-shaped drawing patterns (P1 to P4) and drawing patterns (P5 to P8) which are displayed on the imaginary plane A1 are formed so as to have the uniform width W1, in the drawing patterns (P1 to P8) which are drawn as having the uniform width on the imaginary plane A1, the drawing patterns displayed farther on the road surface spread more widely in the width direction and come to have greater widths. As this occurs, there is caused a problem that the outlines of the drawing patterns become less sharp. Then, in the drawing patterns (P1 to P8) which are displayed on the imaginary plane A1, the drawing patterns which are displayed upper may be drawn as having narrower widths than those of the drawing patterns which are displayed lower. As this occurs, in the drawing patterns (P9 to P12), the drawing patterns which are displayed farther on the road surface Ro are restricted from spreading in the width direction, and therefore, the drawing patterns (P9 to P12) which are displayed on the road surface Ro become uniform in width.

The widths of the drawing patterns (P9 to P12) on the road surface Ro may be determined based on the results of a calculation of the positions thereof from a lane mark Lm1 of a driving lane of the subject vehicle, a lane mark Lm2 of a driving lane of an oncoming vehicle and a median strip Lm3 shown in FIG. 8 which are imaged by the on-board camera 50 or the road monitoring camera 51 by the use of the lamp CPU 41, so that the drawing patterns (P9 to P12) do not protrude from a predetermined range. For example, in the event of the drawing patterns (P9 to P12) being drawn as having a width from the lane mark Lm1 to the medial strip Lm3, it is possible to inform a pedestrian on a shoulder of the driving lane of the subject vehicle of the fact that there is a vehicle approaching without dazzling the driver of an oncoming vehicle on the opposite driving lane. Additionally, in the event of an oncoming vehicle on the opposite driving lane being not imaged by the on-board camera 50 or the road monitoring camera 51, by causing the drawing patterns (P9 to P12) to be drawn as having a width from the lane mark Lm1 to the lane mark Lm2 of the opposite driving lane for an oncoming vehicle, a pedestrian on a shoulder of the opposite driving lane for an oncoming vehicle can also be informed o the fact that there is a vehicle approaching.

In the drawing patterns (P9 to P12), by turning on and off the LED light emitting elements in the order of the LED light emitting elements 18, 19, 20, 21 (in the second embodiment, in the order of light emitting elements 39, 38, 37, 36) by the control unit 11, the belt-shaped or rod-shaped drawing patterns are seen to advance relative to the vehicle to pedestrians. On the contrary, by turning on and off the LED light emitting elements in a reverse order by the control unit 11, the belt-shaped or rod-shaped drawing patterns are seen to reverse relative to the vehicle to the pedestrians. Since the awareness of the drawing patterns is increased, this configuration is desirable in allowing the pedestrians to recognize the approach of the vehicle more easily. Additionally, the LED array (15, 35) can display various drawing patterns on the road surface by selectively controlling the LED light emitting elements to be turned on and the LED light emitting elements to be turned off by the control unit 11.

The invention claimed is:

1. A road surface drawing lamp unit comprising:
a light source module comprising a plurality of light sources; and
an optical system which emits light emitted from the light sources forward of a vehicle,
wherein the light sources form drawing patterns, each of the light sources forming one of the drawing patterns,
wherein the drawings patterns are long in a first direction which is a width direction of a road, and short in a second direction which intersects both the width direction of the road and an emitting axis of the light sources,
wherein the light sources are arranged so that the drawing patterns are drawn at a plurality of locations on the road along the second direction,
wherein the light sources are formed so as to be turned on and off independently, and
wherein one of the drawing patterns formed farther away from the vehicle is drawn shorter in the second direction than that formed nearer to the vehicle.

2. The road surface drawing lamp unit according to claim 1, wherein drawing patterns which extend in a rod-like fashion in the width direction of the road are formed sequentially along the second direction.

3. The road surface drawing lamp unit according to claim 1,
wherein the light sources emit beams of light that spread in a rectangular range which extends in the width direction of the road towards the optical system, and
wherein the optical system forms rod-shaped drawing patterns from the beams of light to the front of the vehicle.

4. The road surface drawing lamp unit according to claim 1, wherein the optical system is a projection lens.

5. The road surface drawing lamp unit according to claim 1, wherein the optical system is a reflecting mirror.

* * * * *